Nov. 6, 1962  J. L. COST  3,062,015
SEPARATION OF GASEOUS MIXTURES
Filed March 8, 1957
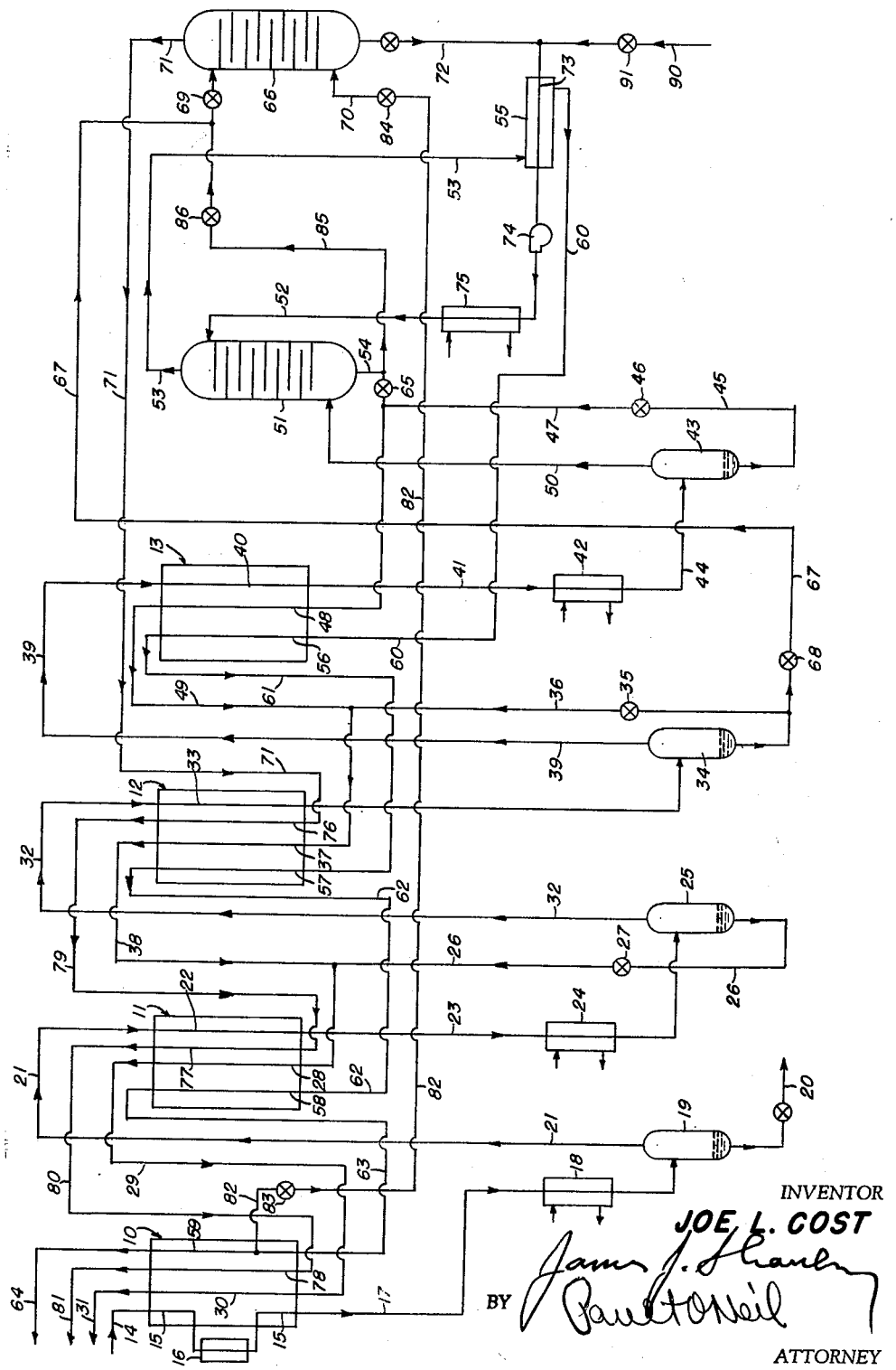
INVENTOR
JOE L. COST
BY
ATTORNEY

United States Patent Office 3,062,015
Patented Nov. 6, 1962

3,062,015
SEPARATION OF GASEOUS MIXTURES
Joe L. Cost, Allentown, Pa., assignor, by mesne assignments, to Air Products and Chemicals, Inc., Trexlertown, Pa., a corporation of Delaware
Filed Mar. 8, 1957, Ser. No. 644,811
7 Claims. (Cl. 62—17)

This invention relates to separation of gaseous mixtures and more particularly to the separation of high purity hydrogen from gaseous hydrogen and hydrocarbon mixtures.

In the past, gaseous hydrogen and hydrocarbon mixtures have been scrubbed with liquid nitrogen to provide a hydrocarbon free product. However, the scrubbing operation results in a product gas containing nitrogen, and the process cannot be practiced when high purity hydrogen product is required.

It is therefore an object of the present invention to provide a novel method of separating gaseous mixtures for producing a high purity hydrogen product.

The present invention provides a method in which gaseous feed containing hydrogen and low boiling point hydrocarbon, which may be obtained by partial liquefaction of a gaseous mixture containing hydrogen and hydrocarbons of different boiling points, is scrubbed with a subcooled liquid, other than nitrogen, which has a boiling point higher than the boiling point of the low boiling point hydrocarbon in the gaseous feed and a freezing point below the lowest temperature level reached in the scrubbing process. There is also provided by the present invention a novel arrangement for continuously supplying a source of scrubbing liquid including a stripping operation in which a portion of the high purity hydrogen product is employed as stripping gas.

The single FIGURE of the drawing discloses a cycle embodying the principles of the present invention in which a stream of gaseous mixture including hydrogen and hydrocarbons of different boiling points is compressed and cooled to separate higher boiling point hydrocarbons by partial liquefaction and a saturated gas stream containing hydrogen and low boiling point hydrocarbon is fed to a scrubbing column. It is to be expressly understood however, that the gas stream fed to the scrubbing column may be at a temperature above its dew point or the feed may be partially liquefied. Moreover, the feed for the scrubbing column may or may not be obtained by a partial liquefaction process. It is to be expressly understood, therefore, that the drawing is designed for purposes of illustration only and not as a definition of the limits of the invention, reference for the latter purpose being had to the appended claims.

With reference more particularly to the drawing, apparatus for producing high purity hydrogen in accordance with the principles of the present invention is shown therein including multi-pass heat exchangers 10, 11, 12 and 13. A compressed stream of feed gas comprising a hydrocarbon mixture including hydrogen, previously treated, if necessary, to substantially completely remove nitrogen, carbon dioxide, carbon monoxide and acetylene, is introduced into the cycle by way of conduit 14. The stream of feed gas is conducted to a pass 15 of the heat exchanger 10 wherein the feed gas passes in countercurrent heat exchange relation with cold product streams described more fully below. The stream of feed gas may be passed in heat exchange relation with a source of auxiliary refrigeration, such as ammonia, in a heat exchanger 16 connected serially in the pass 15. The cooled stream of feed gas is conducted from the cold end of the pass 15 by way of a conduit 17 to a heat exchanger 18 wherein the feed gas is further cooled upon heat exchange with a source of auxiliary refrigeration, such as ethylene, to affect liquefaction of higher boiling point hydrocarbons. The partially liquefied stream is fed to a phase separator 19 from which the liquefied hydrocarbons may be removed by way of conduit 20. The unliquefied portion of the feed gas is withdrawn from the phase separator 19 by way of a conduit 21 and conducted through pass 22 of the heat exchanger 11 in countercurrent heat exchange relation with cold product streams. The further cooled stream of feed gas leaving the cold end of the pass 22 is conducted through a conduit 23 to heat exchanger 24 for heat exchange relationship with a source of auxiliary refrigeration, which may comprise ethylene, to affect further partial liquefaction of the high boiling point hydrocarbons. From the heat exchanger 24 the partially liquefied stream of feed gas is conducted to a phase separator 25 wherein the liquefied portion, which may comprise an ethane rich liquid, is separated from the unliquefied portion and is conducted by way of conduit 26, including an expansion valve 27, through pass 28 of the heat exchanger 11, and by way of conduit 29, through pass 30 of the heat exchanger 10, in countercurrent heat exchange relation with the stream of feed gas. The liquefied portion is vaporized during this heat exchange and is discharged from the cycle by way of conduit 31 in gaseous phase at substantially atmospheric temperature and pressure.

A stream of unliquefied feed gas is withdrawn from the phase separator 25 through conduit 32 and conducted to pass 33 of the heat exchanger 12 wherein the stream is partially liquefied upon heat exchange with cold fluid streams described below. The partially liquefied stream is fed directly to phase separator 34 wherein liquefied hydrocarbons, which may comprise a methane-ethane rich liquid, is separated and removed therefrom, passed through an expansion valve 35, and conducted by conduit 36 through a pass 37 of the heat exchanger 12 in countercurrent heat exchange relationship with the feed gas. The methane-ethane rich fluid stream leaving the warm end of the heat exchanger pass 37 is conducted by a conduit 38 to the conduit 26 and is passed with the ethane rich liquid from the phase separator 25 through the passes 28 and 30 of the heat exchangers 11 and 10, respectively. The unliquefied portion of the feed gas from the phase separator 34 is conducted through a conduit 39 to pass 40 of the heat exchanger 13 wherein the feed gas is further cooled upon countercurrent heat exchange with cold product streams. From the cold end of the pass 40 the stream of feed gas is conducted by way of a conduit 41 to a heat exchanger 42 wherein partial liquefaction of the lowest boiling point hydrocarbon component of the feed gas takes place. The heat exchanger 42 may be provided with a source of liquid nitrogen boiling at atmospheric pressure to affect liquefaction of the lower boiling point hydrocarbons and partial liquefaction of the lowest boiling point hydrocarbon, such as methane for example. The partially liquefied stream of feed gas is conducted from the heat exchanger 42 through a conduit 44 to a phase separator 43 wherein the liquefied portion of the feed gas, principally methane for example, is separated from the unliquefied portion consisting of hydrogen and methane. The methane-rich liquid is withdrawn from the phase separator 43 by way of a conduit 45, and after passing through an expansion valve 46, is conducted by conduit 47 to pass 48 of the heat exchanger 13 for countercurrent heat exchange relation with the feed gas. The methane-rich fluid emerging from the warm end of the pass 48 is conducted by a conduit 49 and merged with the methane-ethane rich liquid in conduit 36 and is passed therewith serially through passes 37, 28 and 30 of the heat exchangers 12, 11 and 10, respectively. The unliquefied portion of the feed gas is withdrawn from the phase separator through a conduit 50; the unliquefied portion comprising principally hydrogen but including a portion of low boiling point hydrocarbon impurity, such as methane, not removed from the feed gas during the partial liquefaction process.

In accordance with the principles of the present invention, the lower boiling point hydrocarbon impurity in the unliquefied portion of the feed gas following the partial liquefaction process is substantially completely removed from the feed gas to provide high purity hydrogen by a scrubbing process, the scrubbing process including the feature of scrubbing the feed gas with a subcooled liquid having a boiling point higher than the boiling point of the low boiling point hydrocarbon impurity and a freezing point below the lowest temperature involved. As shown in the drawing, a stream of cooled unliquefied feed gas withdrawn from the phase separator 43 by way of the conduit 50 is fed to the base of a scrubber column 51 which may be of conventional construction including a series of trays, for example. The scrubbing column is fed at its upper end with a stream of subcooled scrubbing liquid by way of a conduit 52. Gaseous product comprising high purity hydrogen is withdrawn from the upper end of the scrubbed column by way of a conduit 53, while liquid bottom or residue of the scrubbing operation is withdrawn from the bottom of the scrubbing column through a conduit 54, the bottom liquid comprising a mixture of the scrubbing liquid and the low boiling point hydrocarbon impurity. A stream of high purity hydrogen product is passed by way of the conduit 53 through a heat exchange device 55, the purpose of which will appear more fully below, and from the heat exchanger 55 the stream is conducted serially through passes 56, 57, 58 and 59 of heat exchangers 13, 12, 11 and 10, respectively, by way of conduits 60, 61, 62 and 63. High purity hydrogen is delivered from the cycle through a conduit 64 at a pressure substantially corresponding to the pressure of the incoming feed gas. The liquefied portions of the feed gas collecting in the phase separators 25, 34 and 43 are expanded to approximately atmospheric pressure prior to their heat exchange with the feed gas and, if desired, the high purity hydrogen stream may be expanded in a similar manner. The bottom liquid from the scrubbing column is conducted through the conduit 54, and after passing through an expansion valve 65, is merged with the stream of liquefied hydrocarbon in conduit 47 for passage therewith through the heat exchangers 13, 12, 11 and 10 in countercurrent heat exchange relation with the feed gas.

As mentioned above, high purity hydrogen is obtained, according to the present invention, by scrubbing gaseous feed following the partial liquefaction process with subcooled liquid having a boiling point higher than the boiling point of the hydrocarbon impurity present in the feed gas introduced to the scrubbing column and a freezing point below the lowest temperature level in the scrubbing column. The scrubbing liquid is subcooled to the degree necessary to prevent substantial vaporization of the scrubbing liquid and thus provide a hydrogen product substantially free of the scrubbing material and to insure complete removal of the low boiling point hydrocarbon impurity when the proper mol relationship exists between the scrubbing liquid and the feed gas. The subcooled scrubbing liquid may comprise a liquid having a boiling point higher than the boiling point of the low boiling point hydrocarbon impurity, or a mixture of liquids having a bubble point, i.e., initial boiling point, higher than the boiling point of the low boiling point hydrocarbon impurity. In the disclosed cycle in which gaseous mixture containing hydrogen and hydrocarbons of different boiling points is passed through a partial liquefaction process to provide a feed gas containing hydrogen and methane as the low boiling point hydrocarbon impurity, a number of suitable scrubbing liquids are produced during the partial liquefaction process. For example, ethane, propane, propylene, isobutane, butane 1, pentane 1 and isopentane are produced which comprise suitable scrubbing liquids for removing methane since their respective boiling points are higher than the boiling point of methane and since their freezing points are below the lowest temperature level of the cycle. It is to be understood that the scrubbing liquid may comprise mixtures of these hydrocarbons with the mixture including a major portion of one or more hydrocarbons, such as ethane and/or propane for example.

It is another feature of the present invention to provide an arrangement for supplying a continuous stream of subcooled scrubbing liquid. This arrangement includes a stripping column 66 which functions to remove low boiling point hydrocarbon impurity from a source of scrubbing liquid by a stripping operation employing a stream of high purity hydrogen. According to one embodiment of the invention, the source of scrubbing liquid may comprise liquefied hydrocarbons obtained from the feed gas by the partial liquefaction process. For example, a stream of ethane-methane rich liquid may be withdrawn from the phase separator 34 by way of a conduit 67, provided with a flow control valve 68, and introduced into the upper end of the stripping column 66. An expansion valve 69 is preferably included in the conduit 67 for a purpose that will appear more fully below. A stream of high purity hydrogen is introduced by conduit 70 into the bottom of the stripping column 66 to strip low boiling point hydrocarbon impurity, such as methane, from the liquid hydrocarbon mixture flowing downwardly in the stripping column. Top gas withdrawn from the stripping column through a conduit 71 comprises impure hydrogen containing low boiling point hydrocarbon impurity, while the bottom liquid from the stripping column comprises scrubbing liquid substantially free of low boiling point hydrocarbon impurity. The bottom liquid is withdrawn by a conduit 72 and conducted through pass 73 of the heat exchanger 55, and then the cooled liquid is compressed to the pressure of the scrubbing column 51 by means of a compressor 74. The compressed scrubbing liquid is then subcooled in heat exchanger 75 upon heat exchange relation with a suitable refrigerant, such as a source of liquid nitrogen. From the heat exchanger 75 the stream of subcooled scrubbing liquid is introduced by the conduit 52 into the upper end of the scrubbing column. A stream of impure hydrogen top gas is conducted by the conduit 71 to pass 76 of the heat exchanger 12 and from the pass 76 serially through passes 77 and 78 of heat exchangers 11 and 10, respectively, in countercurrent relation with the incoming feed gas, by means of conduits 79 and 80. The impure hydrogen product leaves the cycle by way of conduit 81 at substantially atmospheric temperature and pressure.

The source of high purity hydrogen for the stripping operation is conveniently obtained from the hydrogen product. In order to provide the stripping hydrogen at the proper temperature level, a side stream of high purity hydrogen is withdrawn from the pass 59 of the heat exchanger 10 by way of conduit 82, provided with a control valve 83 and an expansion valve 84, the effluent from the expansion valve being fed to the stripping column by way of the conduit 70. In order to obtain the required stripping operation with a minimum quantity of high purity hydrogen, it is preferable to operate the stripping column at a relatively low pressure to increase the volatility of the low boiling point hydrocarbon impurity. Thus the stripping column may operate under a low pressure such as 30 p.s.i.a. as compared to the pressure of the scrubbing column which may be 300 p.s.i.a., for example. A conduit 85 may be connected between the conduit 54 and the conduit 67 feeding the scrubbing liquid source to the stripping column to provide make-up liquid if desired. The conduit 85 may be provided with a flow control valve 86.

In another mode of operation, the bottom liquid from the scrubbing column 51 may comprise the source of scrubbing liquid and make-up liquid may be obtained from an auxiliary source or from liquefied hydrocarbon produced during the partial liquefaction process. In this case the expansion valve 65 would be closed and the flow control valve 86 opened to feed the bottom liquid from the scrubbing column to the stripping column by way of the conduit 85 and expansion valve 69. Make-up liquid may be provided by feeding liquid collecting in the phase separator 34 through the conduit 67 as determined by the valve 68. In still another mode of operation scrubbing liquid having a boiling point higher than the boiling point of the low boiling point hydrocarbon impurity and a freezing point below the lowest temperature level of the scrubbing cycle, may be introduced to a closed scrubbing liquid purification cycle through conduit 90 connected to the conduit 72 feeding bottom liquid from the stripping column to heat exchanger 55, the conduit 90 being provided with a flow control valve 91. In this arrangement valves 65 and 68 would be closed and valve 86 open so that bottom liquid from the scrubbing column comprises the feed to the stripping column. Required make-up scrubbing liquid may be introduced through the conduit 90. The provision of a closed scrubbing liquid purification cycle supplied with scrubbing liquid from an extraneous source is of particular utility in cycles where cooling of the feed gas prior to its introduction into the scrubbing column does not result in supplying an adequate scrubbing liquid. Of course a closed scrubbing liquid purification cycle may be used, if desired, in cycles in which a partial liquefaction process provides an adequate scrubbing liquid.

The cycle shown in the drawing is designed for producing high purity hydrogen from a feed gas comprising hydrogen and hydrocarbons of different boiling points, such as a mixture of hydroformer gas and platformer gas. It is to be understood, however, that the principles of the present invention are applicable to the separation of high purity hydrogen from other gaseous hydrogen and hydrocarbon mixtures. The average composition of the feed gas entering the cycle by way of the conduit 14 is as follows:

| | Mol percent |
|---|---|
| Hydrogen | 66.34 |
| Nitrogen | 1.32 |
| Carbon monoxide | 0.10 |
| Methane | 12.27 |
| Ethylene ethane | 9.70 |
| Propylene propane | 6.53 |
| Butylene, isobutane and normal butane | 2.17 |
| Pentane, hexane and heavier hydrocarbons | 1.57 |
| | 100.00 |

Following the partial liquefaction process, the feed gas enters the scrubbing column 51 at a temperature of about −290° F. and has the following composition:

| | Mol percent |
|---|---|
| Hydrogen | 96.4 |
| Methane | 2.0 |
| Nitrogen and carbon monoxide | 1.6 |
| | 100.0 |

The source of scrubbing liquid is fed to the stripping column from the phase separator 34 by way of the conduit 67, enters the stripping column at a temperature of about −240° C. and has the following composition:

| | Mol percent |
|---|---|
| Methane | 51.0 |
| Ethane | 42.5 |
| Hydrogen, nitrogen and carbon monoxide | 2.0 |
| Ethylene, propane and heavier hydrocarbons | 4.5 |
| | 100.0 |

A stream of pure hydrogen product at a temperature of about −40° F. is fed to the stripping column at the rate of 1.67 mol per mol of feed to the stripping column. This results in a stripping operation which substantially completely removes methane from the feed liquid and provides a bottom liquid of the following composition:

| | Mol percent |
|---|---|
| Methane | 0.32 |
| Ethane | 93.28 |
| Propylene | 6.31 |
| Butylene | 0.03 |
| Iso butane | 0.06 |
| | 100.00 |

Liquid of the above composition comprises the scrubing liquid fed to the scrubbing column. This liquid leaves the stripping column at a temperature of about −177° F. and is further cooled to about −185° F. in the heat exchanger 55 upon heat exchange relation with pure hydrogen product at approximately −280° F. The scrubbing liquid is slightly warmed upon its pressure being increased in the compressor 74 from the stripping pressure of 30 p.s.i.a. to the scrubbing pressure of 300 p.s.i.a., for example, and is further cooled in the heat exchanger 75 to about −290° F., at which temperature it enters the scrubbing column. The heat exchanger 75 may be fed with a stream of liquid nitrogen at a temperature of about −300° F. In the scrubbing column the methane low boiling point hydrocarbon impurity is substantially removed from the feed gas fed to the scrubbing column to produce a pure hydrogen product of the following composition:

| | Mol percent |
|---|---|
| Hydrogen | 98.26 |
| Nitrogen | 1.44 |
| Carbon monoxide | 0.10 |
| Methane | 0.20 |
| | 100.00 |

The nitrogen and carbon monoxide impurity in the hydrogen product results from the presence of these impurities in the feed gas, and by providing a feed gas free of nitrogen and carbon monoxide, such as by chemically treating the feed gas prior to its introduction into the cycle, hydrogen product of a purity greater than 99.99% may be obtained. The mol relationship of the feed gas and scrubbing liquid fed to the scrubbing column to produce this high purity hydrogen product is 21.7 mol of feed gas to one mol of scrubbing liquid. The impure hydrogen product leaves the stripping column at about −250° F. and has the following composition:

| | Mol percent |
|---|---|
| Hydrogen | 74.70 |
| Nitrogen | 1.65 |
| Carbon monoxide | 0.12 |
| Methane | 23.41 |
| Ethylene and ethane | 0.12 |
| | 100.00 |

The cycle delivers fuel gas through the conduit 31 of the following composition:

| | Mol percent |
|---|---|
| Hydrogen | 1.07 |
| Nitrogen | 1.47 |
| Carbon monoxide | 0.16 |
| Methane | 46.52 |
| Ethane and ethylene | 39.05 |
| Propylene and propane | 10.64 |
| Butylene, iso butane and normal butane | 1.02 |
| Pentane, hexane and heavier hydrocarbons | 0.07 |
| | 100.00 |

The liquid product delivered from the first phase separator 19 through conduit 20 has the following composition:

| | Mol percent |
|---|---|
| Hydrogen | 1.25 |
| Nitrogen | 0.11 |
| Carbon monoxide | 0.01 |
| Methane | 3.92 |
| Ethylene and ethane | 24.78 |
| Propylene and propane | 39.75 |
| Butylene, iso butane and normal butane | 16.98 |
| Pentane, hexane and heavier hydrocarbons | 13.20 |
| | 100.00 |

Although several embodiments of the present invention have been disclosed and described herein, it is to be expressly understood that various changes and substitutions may be made therein without departing from the spirit of the invention as well understood by those skilled in the art. Reference therefore will be had to the appended claims for a definition of the limits of the invention.

What is claimed is:

1. Method of producing substantially pure hydrogen from a hydrogen and hydrocarbon mixture by a low temperature process, comprising the steps of cooling compressed hydrogen and hydrocarbon mixture and separating hydrocarbons therefrom by partial liquefaction to provide cold gaseous mixture including hydrogen and low boiling point hydrocarbon impurity, providing a source of scrubbing liquid including low boiling point hydrocarbon impurity and higher boiling point hydrocarbons, stripping low boiling point hydrocarbon impurity from the scrubbing liquid, the stripped liquid having a boiling point higher than the boiling point of the low boiling point impurity, subcooling the stripped liquid, and scrubbing the cold gaseous mixture with subcooled stripped liquid to substantially completely remove low boiling point hydrocarbon impurity from the gaseous stream.

2. Method of producing substantially pure hydrogen as defined in claim 1 in which a portion of the scrubbed gaseous stream is utilized in the stripping step.

3. Method of producing substantially pure hydrogen from a hydrocarbon mixture including hydrogen by a low temperature process, comprising the steps of cooling compressed hydrocarbon mixture including hydrogen and separating high boiling point hydrocarbons therefrom by partial liquefaction to provide cold gaseous mixture including hydrogen and low boiling point hydrocarbon impurity and liquefied hydrocarbon including low boiling point hydrocarbon impurity and high boiling point hydrocarbon, scrubbing cold gaseous mixture with liquefied hydrocarbon having a bubble point higher than the boiling point of the low boiling point hydrocarbon impurity to remove low boiling point hydrocarbon impurity from the gaseous mixture and produce gaseous hydrogen substantially free of low boiling point hydrocarbon impurity and liquid hydrocarbon including low boiling point hydrocarbon impurity and high boiling point hydrocarbon, stripping liquid hydrocarbon including low boiling point hydrocarbon impurity obtained from the scrubbing step and liquefied hydrocarbon obtained from the separation step with gaseous hydrogen substantially free of low boiling point hydrocarbon impurity to produce liquid hydrocarbon substantially free of low boiling hydrocarbon impurity and having a bubble point higher than the boiling point of the low boiling point hydrocarbon impurity, and utilizing liquid hydrocarbon produced by the stripping step as scrubbing liquid in the scrubbing step.

4. Method of producing substantially pure hydrogen from a hydrogen and hydrocarbon mixture by a low temperature process, comprising the steps of cooling compressed hydrogen and hydrocarbon mixture and separating hydrocarbons therefrom by partial liquefaction to provide a liquid mixture including high boiling point hydrocarbon and low boiling point hydrocarbon impurity and cold gaseous mixture including hydrogen and low boiling point hydrocarbon impurity, stripping low boiling point hydrocarbon impurity from the liquid mixture, subcooling the stripped liquid, and scrubbing the cold gaseous mixture with subcooled stripped liquid to substantially completely remove low boiling point hydrocarbon impurity from the gaseous mixture and provide gaseous hydrogen substantially free of low boiling point hydrocarbon impurity.

5. Method of producing substantially pure hydrogen as defined in claim 4 in which a portion of the gaseous hydrogen is utilized in the stripping step.

6. Method of producing substantially pure hydrogen from a hydrogen and hydrocarbon mixture by a low temperature process, comprising the steps of cooling compressed hydrogen and hydrocarbon mixture and separating hydrocarbons therefrom by partial liquefaction to provide a liquid mixture including high boiling point hydrocarbons and low boiling point hydrocarbon impurity and cold gaseous mixture including hydrogen and low boiling point hydrocarbon impurity, scrubbing cold gaseous mixture with liquid hydrocarbon having a bubble point higher than the boiling point of the low boiling point hydrocarbon impurity to remove low boiling point hydrocarbon impurity from the gaseous mixture and produce gaseous hydrogen substantially free of low boiling point hydrocarbon impurity, stripping a stream of said liquid mixture with gaseous hydrogen substantially free of low boiling point hydrocarbon impurity to produce liquid hydrocarbon substantially free of low boiling point hydrocarbon impurity and having a bubble point higher than the boiling point of the low boiling point hydrocarbon impurity, and utilizing liquid hydrocarbon produced by the stripping step as scrubbing liquid in the scrubbing step.

7. Method of producing substantially pure hydrogen from a hydrogen and hydrocarbon mixture by a low temperature process, comprising the steps of cooling and partially liquefying a compressed stream of hydrogen and hydrocarbon mixture to provide a cold gaseous stream including hydrogen and low boiling point hydrocarbon impurity, scrubbing the cold gaseous stream with subcooled liquid having a boiling point higher than the boiling point of the low boiling point hydrocarbon impurity to remove the low boiling point hydrocarbon impurity from the gaseous stream, scrubbing low boiling point hydrocarbon impurity from the liquid residue of the scrubbing step with a stream of hydrogen to provide a liquid substantially free of low boiling point impurity and having a boiling point higher than the boiling point of the low boiling point impurity for use in the scrubbing step, the scrubbing liquid comprising liquid hydrocarbon obtained upon the partial liquefying of the hydrogen and hydrocarbon mixture.

References Cited in the file of this patent

UNITED STATES PATENTS

| 1,773,012 | Schuftan | Aug. 12, 1930 |
|---|---|---|
| 2,250,949 | Gerlach | July 29, 1941 |
| 2,497,421 | Shiras | Feb. 14, 1950 |
| 2,603,310 | Gilmore | July 15, 1952 |
| 2,685,941 | Kassel | Aug. 10, 1954 |
| 2,689,624 | Davis | Sept. 21, 1954 |
| 2,815,650 | McIntire | Dec. 10, 1957 |
| 2,855,433 | Cobb | Oct. 7, 1958 |
| 2,887,850 | Adams | May 26, 1959 |
| 2,940,270 | Palazzo et al. | June 14, 1960 |

FOREIGN PATENTS

| 372,067 | Great Britain | May 5, 1932 |